UNITED STATES PATENT OFFICE.

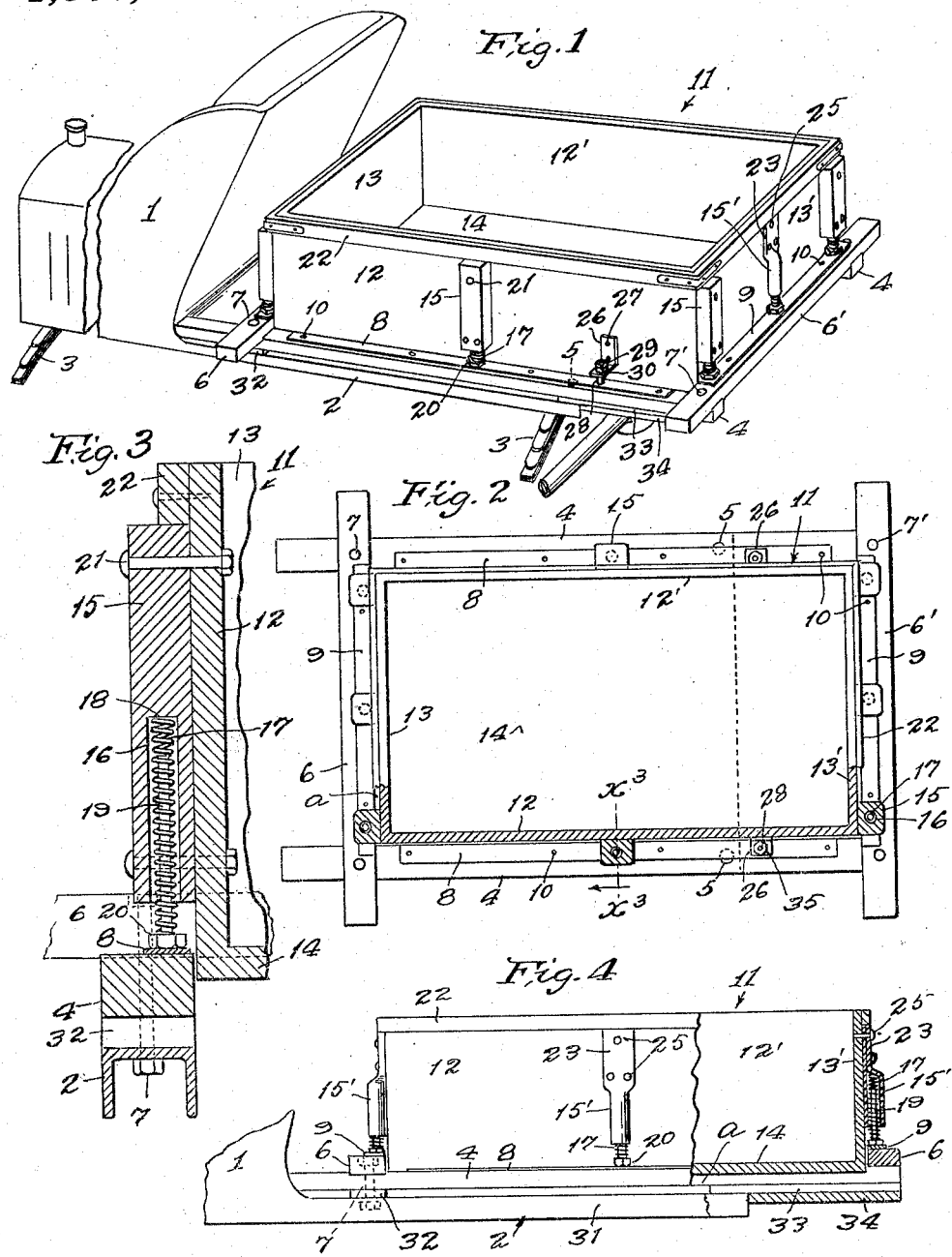

HIRAM W. MONTGOMERY, OF TOPANGA, CALIFORNIA.

VEHICLE.

1,300,185.　　　　Specification of Letters Patent.　　　Patented Apr. 8, 1919.

Application filed August 13, 1917. Serial No. 186,078.

*To all whom it may concern:*

Be it known that I, HIRAM W. MONTGOMERY, a citizen of the United States, residing at Topanga, in the county of Los Angeles and State of California, have invented a new and useful Improvement in Vehicles, of which the following is a specification.

This invention relates to road vehicles and more particularly to those vehicles which are used for transporting berries or ripe fruit over rough country roads.

An object is to provide an appliance adapted to certain touring cars and other forms of automobile in which the chassis is spring-supported and in turn supports the receptacle in which the fruit is to be carried.

The invention is not limited to use for transporting ripe fruit but is applicable in automobiles for the purpose of making the same easier riding.

Many automobiles of the present day having a spring-supported chassis are provided with seats expensively upholstered for the purpose of shielding the occupants in the seat from shock from the chassis as the vehicle wheels pass over irregularities in the road. An object of this invention is to provide for the occupants of the seats of automobiles, as satisfactory protection from the shock from the chassis as has heretofore been attained and at much lower cost.

The invention will be understood, however, by the illustration of its application to a device for carrying ripe blackberries or other soft fruit, and such other articles as are subject to injury or destruction by jars and jolts during transportation.

An object is to allow such fruits and articles to be carried at higher speeds than heretofore practicable at low cost.

Further objects are cheapness, lightness, easy application, noiselessness and efficiency of operation.

An object of the invention is to apply to the platform or frame of an automobile, an auxiliary shock absorber appliance that may be used with or without other shock absorbers and with or without the tonneau and which will so absorb the shock that no damage to the load is apt to result from speedy travel over rough roads.

Also to provide an extension platform that may be utilized when the load carrying box is removed, and to make it easy to remove and replace the box.

Other objects, advantages and features of novelty may appear from the accompanying drawings, the subjoined detail description, and the appended claim.

The accompanying drawings illustrate the invention.

Figure 1 is a fragmental perspective view of an automobile in which this invention is embodied as a berry and ripe fruit marketing device. Two forms of spring sockets are shown.

Fig. 2 is a fragmental plan of parts shown in Fig. 1, portions thereof being sectioned on a horizontal plane.

Fig. 3 is an enlarged vertical section on line $x^3$, Fig. 2.

Fig. 4 is a fragmental side elevation of the appliance in place as shown in Fig. 1.

In Fig. 1 a portion of the vehicle 1 comprising an automobile of a common construction known as a roadster is shown, having a chassis or primary frame 2 supported by springs 3. Upon such frame is mounted an auxiliary frame formed of rails and cross-bars. The rails 4 are in parallelism with each other and are bolted by bolts 5 to the rear end of the primary frame 2. The cross bars 6, 6' are secured to the chassis or primary frame 2 through the medium of the rails 4 and the bolts 5 and 7, 7'. The bolts 7 fasten the front cross-bar 6 to the rails 4, and to the front end of the chassis rails 2. The bolts 7' fasten the rear cross-bar 6' to the rear ends of the rails 4. The chassis rails and the rails 4 and cross-bars 6, 6' thus form a spring supported frame having an open central space a. Reinforcing metal straps 8, on top of the rails, and 9, on top of the cross bars, are fastened in place by any suitable means as screws 10.

A body 11, which in the form shown is a rectangular box adapted to loosely fit in said open space is mounted to move up and down in the guide way formed by the rails 4 and cross bars 6, 6' of said frame. Said guide way prevents lateral and front and rear displacement of the body, but allows free up and down movement thereof. Said box body is constructed of side walls 12, 12', front and back walls 13, 13' and a bottom 14.

Spring socket pieces 15 having cylindrical bores 16 are mounted on the walls of the box, with the axes of the bores in parallelism with the outside faces of said walls.

In the bores 16 of said sockets are mounted helical springs 17 upon the upper ends of which the upper ends 18 of the sockets rest. Said springs loosely fit the bores 16, and their lower ends are supported by the box-guiding frame formed by the rails 4 and cross-bars 6, 6'.

Pins 19, having heads 20 resting on the straps 8 are inserted up into the helical springs 17 and the lower ends of said springs rest on the heads 20, thus insuring springs rest on the heads 20, thus insuring against destructive wear upon the frame work 4, 6, 6'. Said springs are preferably helical steel springs about 7 inches long and the socket bores to receive the same may preferably be about 5½ inches long and are closed at their upper ends, thus leaving about 1½ inches of the spring projecting down from the lower end of the socket so as to allow a free play of about 1¼ inches more or less for the socket pieces upon their spring supports. Said socket pieces may be made of wood as indicated at 15, or of metal as indicated at 15'.

The wooden socket piece is cheaply constructed by boring a hole endwise into a piece of scantling which may be 2x3 inches in cross section or of any other suitable size, depending upon the size of the spring to be used, said wooden socket pieces may be fastened to the walls of the box by bolts 21 inserted through the socket pieces and the side walls. On the outside of the walls of the box, a top strip or bead 22 may be fastened at the top of the box, and the upper ends of the socket pieces 15 are made to abut against the same. The combination of the bead and the wooden socket pieces 15 gives a panel effect to the sides of the box body.

The socket pieces may be made of metal pipe with flattened terminals 23, 24, having holes through which screws or bolts 25 may be inserted to fasten the plates and consequently the socket pieces to the body.

A keeper 26, formed of an angle plate fastened by screws or bolts 27 may be fastened to the walls of the body and loosely connected to the frame 4, 6, 6' by a link formed of a bolt 28; a nut 29 on said bolt engages the horizontal projection 30 of the plate when the box is without load, and said bolt extends down through said plate and through the rails 4 and has a head at its lower end to engage the under side of said frame. The angle plate terminates at a distance above the frame so as to allow ample play of the frame down and up without contact of the plate with the frame. The play of the plate accommodates the compressions of the springs 17 under bouncing load and the nuts of the bolts retain the keepers to prevent the box from jumping out of the frame when the vehicle is bouncing over a rough road.

The keeper bolts 28 are inserted through the rails 4 behind the ends of the frame 2 of the chassis so that whenever the body or box is removed, the keeper bolts may be shoved down through the rails 4 out of the way.

The helical springs 17 are individually light and flexible and a sufficient number of them is provided to resiliently support the body with whatever load it is designed to carry and to prevent the body from knocking upon the frame. By thus providing a multitude of light springs to support the body, the jar transmitted through the vehicle springs 3 to the chassis and from thence through the helical springs 17 to the load carrying body is reduced so as not to be destructive or injurious to soft ripe fruit such as blackberries or figs. The weight of the body 11 puts a constant tension upon the springs with the result that the heavier the load on the springs within the calculated limits thereof, the easier the riding of the body.

It is understood that any desired number of spring sockets and springs therefor may be employed and that as few as three such springs may be sufficient for a light load; one being at the front center and two others at the rear corners. The springs and also the keepers are symmetrically disposed so that the support and retention of the body on the frame will be most effective for the object in view.

All that is necessary in order to remove the body from the frame, is simply to take off the nuts to release the keepers, whereupon the body may be lifted off. Then the keeper bolts may be driven down out of the frame so as not to present any projection on top of the frame. The frame is thus made adaptable for other uses.

In order to give a desirable play of the body 11 above the platform 31 of the vehicle, blocks 32, 33, are applied on top of the platform or chassis frame at the corners thereof to support the frame 11 of the attachment, and the bolts 7 extend through the blocks 32 at the front corners fastening the frame and the blocks to the chassis. The rear blocks 33 are elongate and bolts 5 pass through the front ends thereof while the rear ends project rearward behind the ends of the chassis rails 2 and are screwed to the guide frame by the bolts 7'. The under faces of blocks 33 are flush with the top face of the platform 31; and floor boards 34 are fastened to the under faces of the rearward projections of blocks 33 to make an extension of the platform of the vehicle when the body 11 is removed.

When the body 11 has been removed and the attachment frame is still in place said frame forms a rim to the platform of the vehicle, thus to prevent boxes or crates which may be loaded onto the platform from sliding off sidewise. The space between the blocks 32, 33 admits of a rope to be passed underneath the rails 4 and over the load to hold the load on.

In the form shown the cross-bars 6 and 6′ project outwardly beyond the rails 4, thus affording further attachment for the load-holding rope, not shown.

The bolts which hold the auxiliary frame on the chassis frame are preferably fitted with suitable means as lock nuts 35 to hold the nuts in place.

I claim:—

A utility vehicle comprising spring supported side rails; a seat fixed to the front ends of said side rails; supplemental side rails fixed to said spring supported side rails and spaced apart to receive a berry box; a front cross bar fixed to the supplemental side rails behind the seat; a rear cross bar fixed to the supplemental rails rearwardly beyond the ends of the spring supported side rails; a berry box movable up and down in the space formed between the side rails and the front and rear cross bars and provided on the outside with sockets for spring guides; helical springs in said sockets, said springs resting upon the side rails and cross bars respectively to support the berry box; and lost motion means retaining the supplemental side rails and cross bars in position with the springs resting on said rails.

In testimony whereof, I have hereunto set my hand at Los Angeles, California, this 3rd day of August, 1917.

HIRAM W. MONTGOMERY.

Witness:
JAMES R. TOWNSEND.

Copies of this patent may be obtained for five cents each, by addressing the "Commissioner of Patents, Washington, D. C."